(12) United States Patent
Seo (10) Patent No.: US 11,499,348 B2
(45) Date of Patent: Nov. 15, 2022

(54) POWER CHILD LOCK DEVICE

(71) Applicants: Hyundai Motor Company, Seoul (KR); Kia Motors Corporation, Seoul (KR)

(72) Inventor: Yongdae Seo, Seoul (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 509 days.

(21) Appl. No.: 16/663,595

(22) Filed: Oct. 25, 2019

(65) Prior Publication Data

US 2021/0054666 A1 Feb. 25, 2021

(30) Foreign Application Priority Data

Aug. 19, 2019 (KR) ........................ 10-2019-0100815

(51) Int. Cl.
| | |
|---|---|
| *E05B 77/26* | (2014.01) |
| *F16H 55/22* | (2006.01) |
| *E05B 81/06* | (2014.01) |
| *E05B 65/00* | (2006.01) |

(52) U.S. Cl.
CPC ............. *E05B 77/26* (2013.01); *F16H 55/22* (2013.01); *E05B 65/0014* (2013.01); *Y10T 292/1021* (2015.04); *Y10T 292/1082* (2015.04); *Y10T 292/307* (2015.04); *Y10T 292/308* (2015.04)

(58) Field of Classification Search
CPC ...... E05B 77/22; E05B 77/26; E05B 65/0014; Y10T 292/1021; Y10T 292/1082; Y10T 292/307; Y10T 292/308
See application file for complete search history.

(56) References Cited

U.S. PATENT DOCUMENTS

| | | | | | |
|---|---|---|---|---|---|
| 2,785,916 | A | * | 3/1957 | Mutti ...................... | E05B 81/34 |
| | | | | | 292/144 |
| 2,916,319 | A | * | 12/1959 | Du Bois ................. | E05B 81/22 |
| | | | | | 292/DIG. 43 |
| 3,933,382 | A | * | 1/1976 | Counts .................... | E05B 83/12 |
| | | | | | 292/201 |
| 4,659,121 | A | * | 4/1987 | McGee ............... | E05B 47/0002 |
| | | | | | 292/144 |

(Continued)

FOREIGN PATENT DOCUMENTS

| | | | | | |
|---|---|---|---|---|---|
| CN | 106401324 | A | * | 2/2017 | ............. E05B 77/24 |
| CN | 107461088 | A | | 12/2017 | |

(Continued)

OTHER PUBLICATIONS

European Patent Office, European Search Report issued in EP Application No. 19208492, dated Apr. 23, 2020.

*Primary Examiner* — Carlos Lugo
(74) *Attorney, Agent, or Firm* — Slater Matsil, LLP (57) ABSTRACT

A power child lock device includes a rotation driving mechanism, a switch link connected to the rotation driving mechanism so as to be moved vertically by a rotational force of the rotation driving means, an inside handle lever cooperatively connected to an inside handle installed in a door of a vehicle, a release lever connected to a door catch and configured to lock or release the door catch, and a power child lever configured to selectively connect or separate the inside handle lever and the release lever by being moved by the switch link.

20 Claims, 6 Drawing Sheets

(56) References Cited

U.S. PATENT DOCUMENTS

| | | | | |
|---|---|---|---|---|
| 4,799,719 A | * | 1/1989 | Wood | E05B 47/0012 292/144 |
| 4,900,074 A | * | 2/1990 | Kleefeldt | E05B 77/265 292/216 |
| 4,917,419 A | * | 4/1990 | Mora, Jr. | E05B 47/026 70/279.1 |
| 5,052,731 A | * | 10/1991 | Hayakawa | E05B 77/265 292/336.3 |
| 5,078,436 A | | 1/1992 | Kleefeldt et al. | |
| 5,079,964 A | * | 1/1992 | Hamada | E05B 81/25 292/201 |
| 5,092,638 A | * | 3/1992 | Mizuki | E05B 77/265 292/216 |
| 5,125,701 A | * | 6/1992 | Hayakawa | E05B 77/265 292/336.3 |
| 5,180,198 A | * | 1/1993 | Nakamura | E05B 81/20 292/201 |
| 5,537,848 A | * | 7/1996 | Grzanka | E05B 77/28 292/201 |
| 5,715,713 A | * | 2/1998 | Aubry | E05B 77/28 292/216 |
| 5,746,459 A | * | 5/1998 | Giroux, Jr. | E05B 81/22 292/341.16 |
| 6,079,757 A | * | 6/2000 | Aubry | E05B 81/16 292/216 |
| 6,199,923 B1 | * | 3/2001 | Rice | E05B 77/26 292/216 |
| 6,497,162 B2 | * | 12/2002 | Spurr | E05B 81/25 292/201 |
| 8,494,680 B2 | * | 7/2013 | Sparenberg | E05B 47/026 292/144 |
| 9,845,624 B2 | * | 12/2017 | Erices | E05B 81/28 |
| 10,472,868 B2 | * | 11/2019 | Nozawa | E05B 81/16 |
| 10,619,385 B2 | | 4/2020 | Cetnar | |
| 10,808,424 B2 | * | 10/2020 | Griddle | E05B 47/02 |
| 11,225,814 B2 | * | 1/2022 | Han | E05B 79/20 |
| 11,280,118 B2 | * | 3/2022 | Davis | E05B 81/16 |
| 2011/0214460 A1 | * | 9/2011 | Byun | E05C 9/10 70/91 |

FOREIGN PATENT DOCUMENTS

| | | | |
|---|---|---|---|
| CN | 110094120 A | | 8/2019 |
| EP | 0892136 A1 | | 1/1999 |
| EP | 3392434 A1 | | 10/2018 |
| EP | 3517716 A1 | | 7/2019 |
| KR | 970043855 A | * | 7/1997 |
| KR | 101216625 B1 | * | 12/2012 |

* cited by examiner

POWER CHILD LOCK DEVICE

CROSS-REFERENCE TO RELATED APPLICATIONS

This application claims priority to Korean Patent Application No. 10-2019-0100815, filed in the Korean Intellectual Property Office on Aug. 19, 2019, which application is hereby incorporated herein by reference.

TECHNICAL FIELD

The present invention relates to a power child lock device.

BACKGROUND

An inside lever capable of being used to open a door is provided at a seat of a vehicle in the related art. In particular, a rear seat is provided with a child lock device to prevent a child from opening the door arbitrarily.

The child lock device is provided in the form of a lever on an inner panel of the door and locked or unlocked by the lever manually operated by an occupant. Recently, a so-called power child lock device is commonly installed to improve convenience, and a driver locks or unlocks the child lock device by operating a switch.

A power child lock device in the related art includes a drive motor operated by being supplied with power as a driver operates a switch, a worm serving as a driving gear provided in the drive motor, a first operating lever having a worm gear that meshes with the worm, a second operating lever having one end connected to the first operating lever so as to be rotated integrally with the first operating lever, a release lever coupled to the second operating lever and connected to the door lock device, an inside handle lever cooperatively connected to a door inside handle, and a power child lock switch operated by the driver to unlock or lock the power child lock device.

Therefore, when the driver operates the power child lock switch in a release direction, power is supplied to the drive motor, the drive motor rotates in one direction, the worm mounted in the drive motor rotates simultaneously by the rotation of the drive motor, the first operating lever rotates clockwise by means of the worm gear by the rotation of the worm, the second operating lever also rotates clockwise by the rotation of the first operating lever, and the release lever is pulled, such that the power child lock device is unlocked to open the door.

However, in the power child lock device in the related art as described above, because the power child lock function for the rear door is implemented by using the multiple levers, the structure is complicated and disadvantageous in terms of weight and cost reduction.

The above information disclosed in this Background section is only for enhancement of understanding of the background of the invention and therefore it may contain information that does not form the prior art that is already known in this country to a person of ordinary skill in the art.

SUMMARY

The present invention relates to a power child lock device. Particular embodiments relate to a power child lock device having a simple structure and being capable of locking and unlocking a rear door of a vehicle by using rotational force of a motor.

Embodiments of the present invention can provide a power child lock device capable of simplifying a structure by using a simple link structure and smoothly performing a power child lock function and a release function for a rear door.

An exemplary embodiment of the present invention provides a power child lock device that includes a rotation driving mechanism, a switch link connected to the rotation driving mechanism so as to be moved vertically by a rotational force of the rotation driving mechanism, an inside handle lever cooperatively connected to an inside handle installed in a door of a vehicle, a release lever connected to a door catch and configured to lock or release the door catch, and a power child lever configured to selectively connect or separate the inside handle lever and the release lever by being moved by the switch link.

The rotation driving mechanism may be a drive motor capable of rotating clockwise and counterclockwise.

The drive motor may have a worm integrally rotated therewith, and the switch link may have a cylindrical worm wheel gear meshing with the worm.

The switch link may have a link body extending vertically, one side of the link body may be provided with the cylindrical worm wheel gear that protrudes from the link body, and a lower end of the link body may be provided with a pressing flange configured to press the power child lever and protruding in a direction opposite to the cylindrical worm wheel gear.

The power child lock device may further include a power child lock switch configured to be turned on or off by the switch link in accordance with the movement of the switch link.

The link body may have a switch contact flange configured to turn on the power child lock switch by coming into contact with the power child lock switch, and the link body may have a switch-off inclined surface configured to turn off the power child lock switch by being spaced apart from the power child lock switch when the switch link moves downward.

An upper portion of the power child lever may be provided with an elliptical long hole into which a pin is inserted so that the power child lever is rotatable by means of the pin, a lower portion of the power child lever may be provided with a coupling protrusion, and a rim of the long hole may be pressed by the pressing flange, such that the power child lever may be moved through the long hole with the pin inserted into the power child lever.

An upper portion of the release lever may be provided with a pin hole into which the pin is inserted so that the release lever is rotated by means of the pin, and a lower portion of the release lever may be provided with a coupling groove into which the coupling protrusion is inserted so that the release lever is connected to the power child lever.

An upper portion of the inside handle lever may be provided with a pin hole into which the pin is inserted so that the inside handle lever is rotatable by means of the pin, a lower portion of the inside handle lever may be provided with a connecting hole into which a cable is inserted and connected so that the inside handle lever is connected, through the cable, to the inside handle installed in the door of the vehicle, and a coupling groove, into which the coupling protrusion is inserted so that the inside handle lever is connected to the release lever through the power child lever, may be provided between the pin hole and the connecting hole.

The power child lock device may further include a return spring configured to return the power child lever and the release lever to original positions.

The following reference numerals can be used in conjunction with the drawings:

10: Drive motor
20: Worm
30: Switch link
31: Worm wheel gear
32: Link body
33: Pressing flange
40: Release lever
41: Pin hole
42: Coupling groove
50: Inside handle lever
51: Pin hole
52: Cable
53: Connecting hole
54: Coupling groove
60: Power child lever
61: Long hole
62: Coupling protrusion
63: Rim
70: Power child lock switch
81, 82: Return spring

DETAILED DESCRIPTION OF ILLUSTRATIVE EMBODIMENTS

Hereinafter, exemplary embodiments of the present invention will be described in detail with reference to the accompanying drawings.

Figure 1:
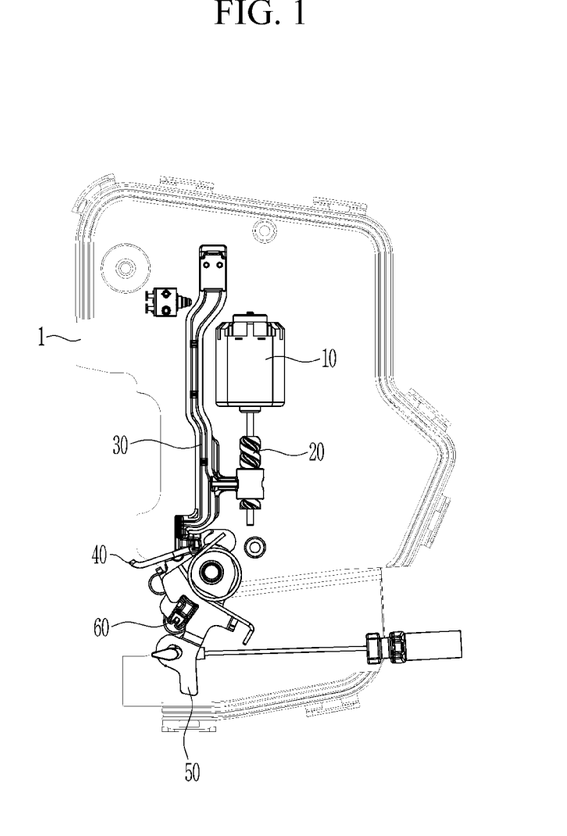
FIG. 1 is a front view illustrating a state in which a power child lock device according to an exemplary embodiment of the present invention is mounted in a casing.
Figure 2:
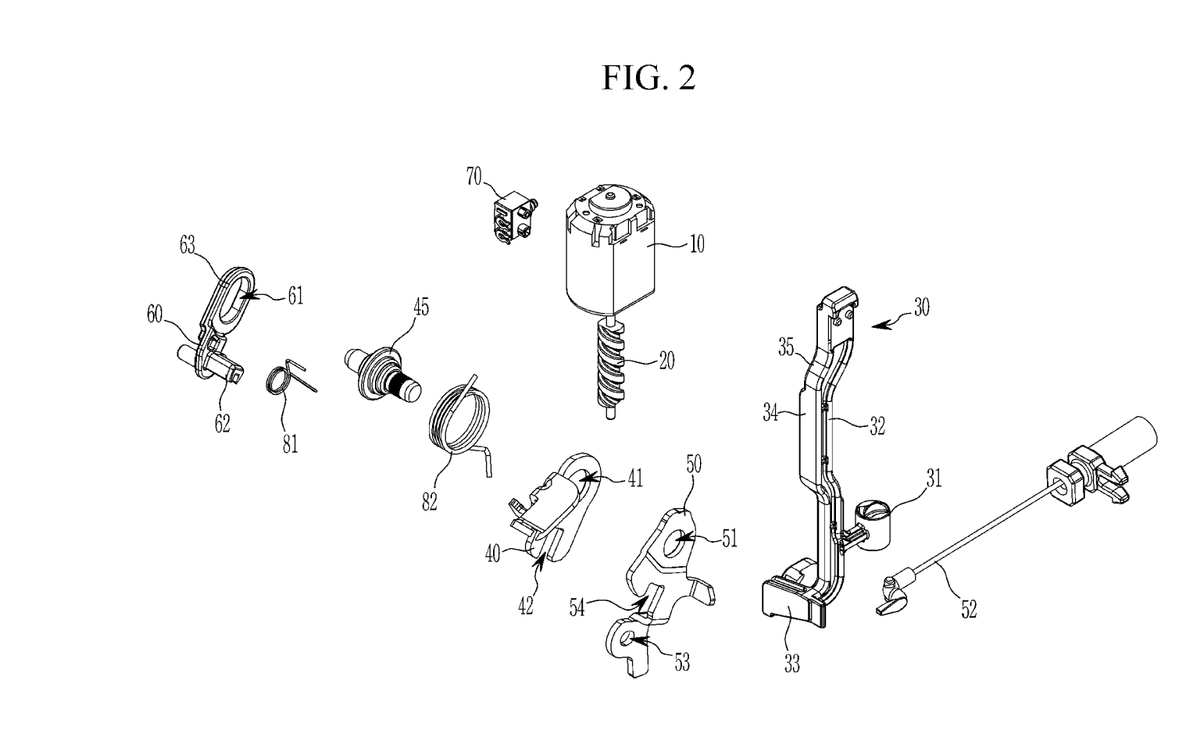
FIG. 2 is an exploded perspective view illustrating the power child lock device according to the exemplary embodiment of the present invention.

Referring to FIGS. 1 and 2, a power child lock device according to an exemplary embodiment of the present invention may include a drive motor 10 serving as a rotation driving mechanism capable of rotating clockwise and counterclockwise, a worm 20 provided on a motor shaft of the drive motor 10, a switch link 30 moved vertically by an operation of the drive motor 10 and having a cylindrical worm wheel gear 31 meshing with the worm 20, a release lever 40 connected to a door latch by means of a cable and the like to release the door latch and installed to be rotatable by means of a pin 45, an inside handle lever 50 installed to be rotatable by means of the pin 45 and connected, by means of a cable 52, to an inside handle installed in a door of a vehicle, and a power child lever 60 configured to connect or separate the release lever 40 and the inside handle lever 50.

The drive motor 10 may be embedded in a casing 1.

The switch link 30 may have a link body 32 extending vertically based on the drawings. The cylindrical worm wheel gear 31, which protrudes approximately vertically from the link body 32, may be provided at one side of the link body 32. A pressing flange 33, which protrudes in a direction opposite to the cylindrical worm wheel gear 31, may be provided at a lower end of the link body 32.

In addition, the power child lock device may further include a power child lock switch 70 turned on or off by the switch link 30 as the switch link 30 moves vertically and configured to transmit on/off signals to a door latch controller.

A switch contact flange 34 may extend vertically from an upper portion of the link body 32, and the switch contact flange 34 comes into contact with the power child lock switch 70 to turn on the power child lock switch 70. The switch link 30 may have a switch-off inclined surface 35 inclined vertically to turn off the power child lock switch 70 by being spaced apart from the power child lock switch 70 when the switch link 30 moves downward.

When the drive motor 10 rotates in one direction, the worm 20 rotates integrally with the motor 10, the cylindrical worm wheel gear 31 and the switch link 30 are moved downward by the rotation of the worm 20. When the drive motor 10 rotates in the other direction, the worm wheel gear 31 and the switch link 30 are moved upward.

An elliptical long hole 61 into which the pin 45 is inserted may be formed in an upper portion of the power child lever 60 so that the power child lever 60 may be rotated by means of the pin 45. A coupling protrusion 62 may be provided at a lower portion of the power child lever 60. A rim 63 of the long hole 61 is pressed by the pressing flange 33, such that the power child lever 60 may be moved downward by means of the long hole 61 with the pin 45 inserted into the power child lever 60.

An upper portion of the release lever 40 may be provided with a pin hole 41 into which the pin 45 is inserted so that the release lever 40 may be rotated by means of the pin 45. A lower portion of the release lever 40 may be provided with a coupling groove 42 into which the coupling protrusion 62 is inserted so that the release lever 40 is connected to the power child lever 60.

An upper portion of the inside handle lever 50 may be provided with a pin hole 51 into which the pin 45 is inserted so that the inside handle lever 50 may be rotated by means of the pin 45. A lower portion of the inside handle lever 50 may be provided with a connecting hole 53 into which the cable 52 is inserted and connected so that the inside handle lever 50 is connected, by means of the cable 52, to the inside handle installed in the door of the vehicle. A coupling groove 54 may be provided between the pin hole 51 and the connecting hole 53, such that the coupling protrusion 62 is inserted into the coupling groove 54 so that the inside handle lever 50 is connected to the release lever 40 by means of the power child lever 60.

In addition, the power child lock device may further include return springs 81 and 82 configured to return the power child lever 60 and the release lever 40 to the original positions.

Figure 3:
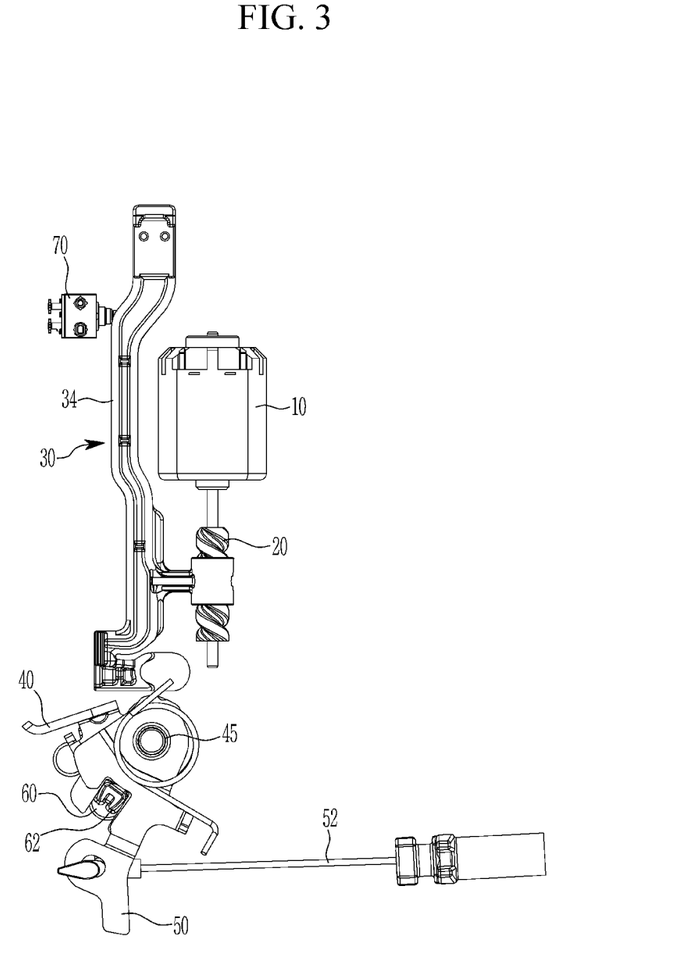
FIG. 3 is a front view illustrating a state in which the power child lock device according to the exemplary embodiment of the present invention is released.

FIG. 3 illustrates a state in which the power child lock device according to the exemplary embodiment of the present invention is released. In the state in which the switch link 30 is moved upward, the power child lock switch 70 is turned on by coming into contact with the switch contact flange 34 of the switch link 30, and the coupling protrusion 62 of the power child lever 60 is inserted into the coupling groove 42 of the release lever 40 and the coupling groove 54 of the inside handle lever 50, such that the release lever 40 and the inside handle lever 50 are integrally connected with each other through the power child lever 60.

Figure 4:
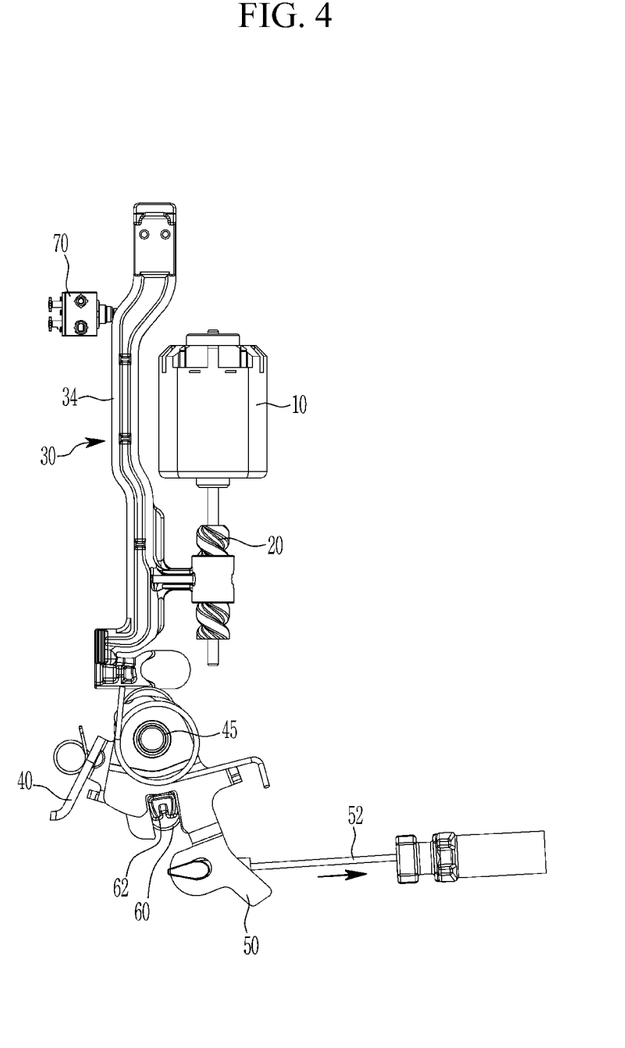
FIG. 4 is a view for explaining an operation of an inside handle in a state in which the power child lock device according to the exemplary embodiment of the present invention is released.

In this state, when an occupant pulls the inside handle installed in the rear door of the vehicle to open the rear door of the vehicle, an operating force of the inside handle is transmitted to the inside handle lever 50 through the cable 52. As a result, as illustrated in FIG. 4, the inside handle lever 50 is rotated counterclockwise, and the release lever 40 is also simultaneously rotated counterclockwise by the inside handle lever 50, such that the door latch connected to the release lever by a cable or a rod is released, and thus the rear door may be opened.

Figure 5:
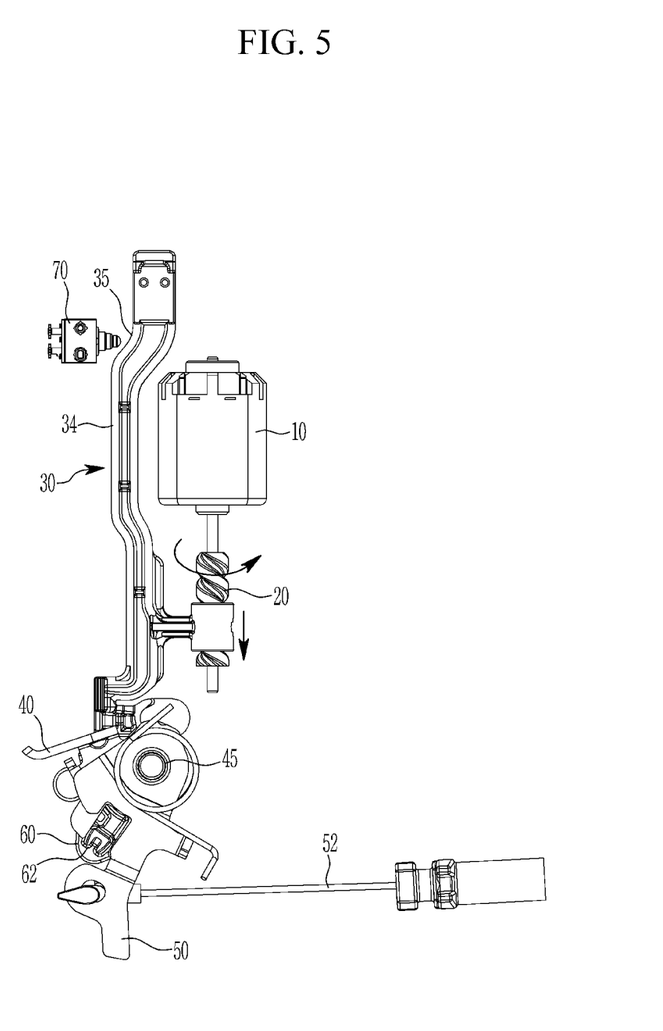
FIG. 5 is a front view illustrating a state in which the power child lock device according to the exemplary embodiment of the present invention is locked.

Meanwhile, as illustrated in FIG. 5, when the driver operates a switch or the like to operate the power child lock, power is applied to the drive motor 10, the drive motor 10 rotates in one direction, the worm 20 is rotated by the rotation of the drive motor 10, the cylindrical worm wheel gear 31 is moved downward, and the switch link 30 is also moved downward.

Therefore, the switch-off inclined surface 35 of the switch link 30 is positioned to face the power child lock switch 70, such that the power child lock switch 70 is turned off by becoming spaced apart from the switch link 30.

Further, the pressing flange 33 of the switch link 30 presses downward the rim 63 of the power child lever 60 by the downward movement of the switch link 30. Therefore, with the pin 45 inserted into the power child lever 60, the power child lever 60 is moved downward, and the coupling protrusion 62 is withdrawn from the coupling groove 54 of the inside handle lever 50, such that the inside handle lever 50 and the release lever 40 are separated without being connected with each other through the power child lever 60.

Figure 6:
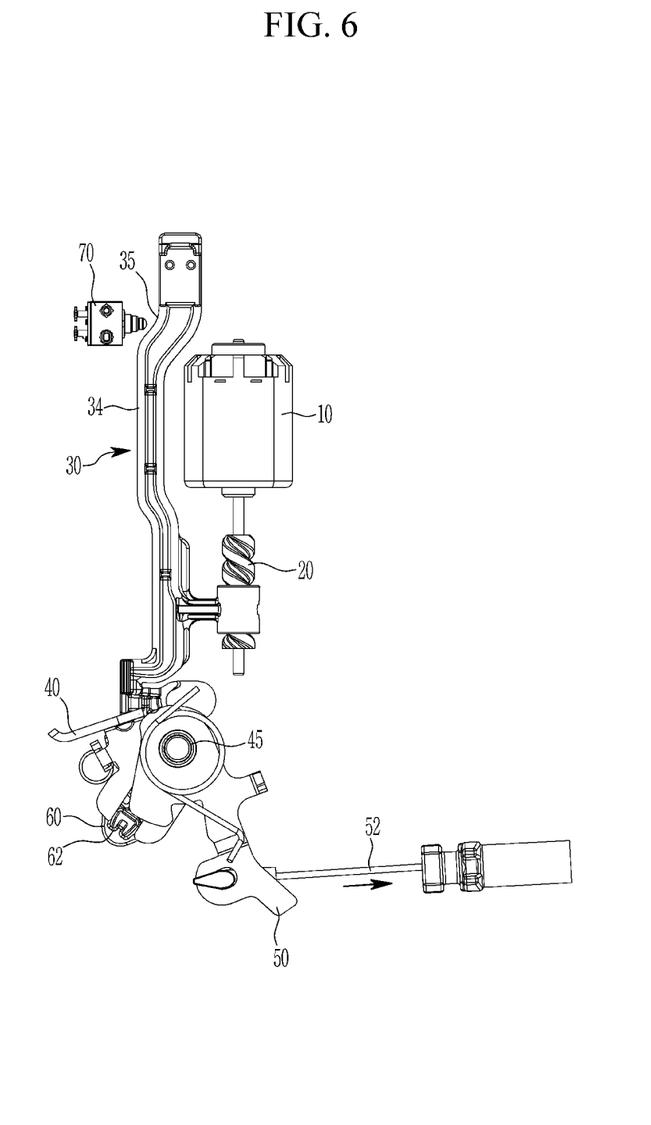
FIG. 6 is a view for explaining an operation of the inside handle in a state in which the power child lock device according to the exemplary embodiment of the present invention is locked.

In this state, as illustrated in FIG. 6, when the occupant pulls the inside handle installed in the rear door of the vehicle to open the rear door of the vehicle, the operating force of the inside handle is transmitted to the inside handle lever 50 through the cable 52, such that the inside handle lever 50 is rotated counterclockwise. However, because the inside handle lever 50 and the release lever 40 are not connected to each other, the release lever 40 is not rotated, and the release operating force is not transmitted to the door latch through the release lever 40, such that the rear door remains locked, and the rear door cannot be opened.

Meanwhile, when the driver releases the power child lock by operating the switch or the like, the drive motor 10 rotates in the other direction, and the switch link 30 returns to the state illustrated in FIG. 3 while moving upward again.

According to the power child lock device according to the exemplary embodiment of the present invention, it is possible to reduce the number of components, costs and weights by simplifying the mechanism for operating the power child lock. In addition, it is possible to improve operational reliability by simplifying the power child lock structure.

While this invention has been described in connection with what is presently considered to be practical exemplary embodiments, it is to be understood that the invention is not limited to the disclosed embodiments. On the contrary, it is intended to cover various modifications and equivalent arrangements included within the spirit and scope of the appended claims.

What is claimed is:

1. A power child lock device comprising:
   a rotation driving mechanism, wherein the rotation driving mechanism is a drive motor capable of rotating clockwise and counterclockwise, the drive motor having a worm integrally rotatable therewith;
   a switch link connected to the rotation driving mechanism so as to be vertically movable by a rotational force of the rotation driving mechanism, the switch link having a cylindrical member meshing with the worm, wherein the switch link has a link body extending vertically and one side of the link body is provided with the cylindrical member that protrudes from the link body;
   an inside handle lever cooperatively connected to an inside handle installed in a door of a vehicle;
   a release lever connected to a door catch and configured to lock or release the door catch; and
   a power child lever configured to selectively connect or separate the inside handle lever and the release lever by being moved by the switch link;
   wherein a lower end of the link body is provided with a pressing flange configured to press the power child lever and protruding in a direction opposite to the cylindrical member;
   wherein an upper portion of the power child lever is provided with an elliptical long hole into which a pin is inserted so that the power child lever is rotatable by means of the pin;
   wherein a lower portion of the power child lever is provided with a coupling protrusion; and
   wherein a rim of the long hole is pressed by the pressing flange, such that the power child lever is moved through the long hole with the pin inserted into the power child lever.

2. The power child lock device of claim 1, further comprising a power child lock switch configured to be turned on or off by the switch link in accordance with movement of the switch link.

3. The power child lock device of claim 2, wherein:
   the link body has a switch contact flange configured to turn on the power child lock switch by coming into contact with the power child lock switch; and
   the link body has a switch-off inclined surface configured to turn off the power child lock switch by being spaced apart from the power child lock switch when the switch link moves downward.

4. The power child lock device of claim 1, wherein:
   an upper portion of the release lever is provided with a pin hole into which the pin is inserted so that the release lever is rotated by means of the pin; and
   a lower portion of the release lever is provided with a coupling groove into which the coupling protrusion is inserted so that the release lever is connected to the power child lever.

5. The power child lock device of claim 4, wherein:
   an upper portion of the inside handle lever is provided with a pin hole into which the pin is inserted so that the inside handle lever is rotatable by means of the pin,
   a lower portion of the inside handle lever is provided with a connecting hole into which a cable is inserted and connected so that the inside handle lever is connected, through the cable, to the inside handle installed in the door of the vehicle, and
   a coupling groove, into which the coupling protrusion is inserted so that the inside handle lever is connected to the release lever through the power child lever, is provided between the pin hole and the connecting hole.

6. The power child lock device of claim 5, further comprising a return spring configured to return the power child lever and the release lever to original positions.

7. A vehicle door comprising:
an inside handle;
a rotation driving mechanism, wherein the rotation driving mechanism is a drive motor capable of rotating clockwise and counterclockwise, the drive motor having a worm integrally rotatable therewith;
a switch link connected to the rotation driving mechanism so as to be vertically movable by a rotational force of the rotation driving mechanism, the switch link having a cylindrical member meshing with the worm, wherein the switch link has a link body extending vertically and one side of the link body is provided with the cylindrical member that protrudes from the link body;
an inside handle lever cooperatively connected to the inside handle;
a release lever connected to a door catch and configured to lock or release the door catch; and
a power child lever configured to selectively connect or separate the inside handle lever and the release lever by being moved by the switch link;
wherein a lower end of the link body is provided with a pressing flange configured to press the power child lever and protruding in a direction opposite to the cylindrical member;
wherein an upper portion of the power child lever is provided with an elliptical long hole into which a pin is inserted so that the power child lever is rotatable by means of the pin;
wherein a lower portion of the power child lever is provided with a coupling protrusion; and
wherein a rim of the long hole is pressed by the pressing flange, such that the power child lever is moved through the long hole with the pin inserted into the power child lever.

8. The vehicle door of claim 7, further comprising a power child lock switch configured to be turned on or off by the switch link in accordance with movement of the switch link.

9. The vehicle door of claim 8, wherein:
the link body has a switch contact flange configured to turn on the power child lock switch by coming into contact with the power child lock switch; and
the link body has a switch-off inclined surface configured to turn off the power child lock switch by being spaced apart from the power child lock switch when the switch link moves downward.

10. The vehicle door of claim 7, wherein:
an upper portion of the release lever is provided with a pin hole into which the pin is inserted so that the release lever is rotated by means of the pin; and
a lower portion of the release lever is provided with a coupling groove into which the coupling protrusion is inserted so that the release lever is connected to the power child lever.

11. The vehicle door of claim 10, wherein:
an upper portion of the inside handle lever is provided with a pin hole into which the pin is inserted so that the inside handle lever is rotatable by means of the pin,
a lower portion of the inside handle lever is provided with a connecting hole into which a cable is inserted and connected so that the inside handle lever is connected, through the cable, to the inside handle installed in the vehicle door, and
a coupling groove, into which the coupling protrusion is inserted so that the inside handle lever is connected to the release lever through the power child lever, is provided between the pin hole and the connecting hole.

12. The vehicle door of claim 11, further comprising a return spring configured to return the power child lever and the release lever to original positions.

13. A power child lock device comprising:
a rotation driving mechanism, wherein the rotation driving mechanism is a drive motor capable of rotating clockwise and counterclockwise, the drive motor having a worm integrally rotatable therewith;
a switch link connected to the rotation driving mechanism so as to be vertically movable by a rotational force of the rotation driving mechanism, the switch link having a cylindrical member meshing with the worm, wherein the switch link has a link body extending vertically and one side of the link body is provided with the cylindrical member that protrudes from the link body;
an inside handle lever cooperatively connected to an inside handle installed in a door of a vehicle;
a release lever connected to a door catch and configured to lock or release the door catch; and
a power child lever configured to selectively connect or separate the inside handle lever and the release lever by being moved by the switch link;
wherein a lower end of the link body is provided with a pressing flange configured to press the power child lever and protruding in a direction opposite to the cylindrical member;
wherein an upper portion of the power child lever is provided with an elliptical long hole into which a pin is inserted so that the power child lever is rotatable by means of the pin;
wherein an upper portion of the release lever is provided with a pin hole into which the pin is inserted so that the release lever is rotated by means of the pin;
wherein a lower portion of the power child lever is provided with a coupling protrusion; and
wherein a rim of the long hole is pressed by the pressing flange, such that the power child lever is moved through the long hole with the pin inserted into the power child lever.

14. The power child lock device of claim 13, further comprising a power child lock switch configured to be turned on or off by the switch link in accordance with movement of the switch link.

15. The power child lock device of claim 14, wherein:
the link body has a switch contact flange configured to turn on the power child lock switch by coming into contact with the power child lock switch; and
the link body has a switch-off inclined surface configured to turn off the power child lock switch by being spaced apart from the power child lock switch when the switch link moves downward.

16. The power child lock device of claim 13, wherein a lower portion of the release lever is provided with a coupling groove into which the coupling protrusion is inserted so that the release lever is connected to the power child lever.

17. The power child lock device of claim 16, wherein an upper portion of the inside handle lever is provided with a pin hole into which the pin is inserted so that the inside handle lever is rotatable by means of the pin.

18. The power child lock device of claim 17, wherein a lower portion of the inside handle lever is provided with a connecting hole into which a cable is inserted and connected so that the inside handle lever is connected, through the cable, to the inside handle installed in the door of the vehicle.

19. The power child lock device of claim 18, wherein a coupling groove, into which the coupling protrusion is inserted so that the inside handle lever is connected to the release lever through the power child lever, is provided between the pin hole and the connecting hole.

20. The power child lock device of claim 19, further comprising a return spring configured to return the power child lever and the release lever to original positions.

\* \* \* \* \*